A. N. RUTAN.
REFACING AND RECOUNTERBORING TOOL.
APPLICATION FILED AUG. 29, 1912.

1,073,526. Patented Sept. 16, 1913.

WITNESSES
Philip E. Barnes
Madeline McCrory

Archie N. Rutan INVENTOR
by James J. Sheehy & Co.,
Attorneys.

COLUMBIA PLANOGRAPH CO., WASHINGTON, D. C.

UNITED STATES PATENT OFFICE.

ARCHIE N. RUTAN, OF ELMIRA, NEW YORK.

REFACING AND RECOUNTERBORING TOOL.

1,073,526.     Specification of Letters Patent.     Patented Sept. 16, 1913.

Application filed August 29, 1912. Serial No. 717,778.

*To all whom it may concern:*

Be it known that I, ARCHIE N. RUTAN, a citizen of the United States, residing at Elmira, in the county of Chemung and State of New York, have invented new and useful Improvements in Refacing and Re-counterboring Tools, of which the following is a specification.

My present invention pertains to metal-working tools, and contemplates the provision of a simple, efficient and easily operated refacing and re-counterboring tool, designed more especially for refacing and re-counterboring triple-valves which are broken off or have stripped or worn threads at the union connection of their check-valve case portions, and this without the necessity of removing the triple-valves from their complementary parts.

Figure 1:
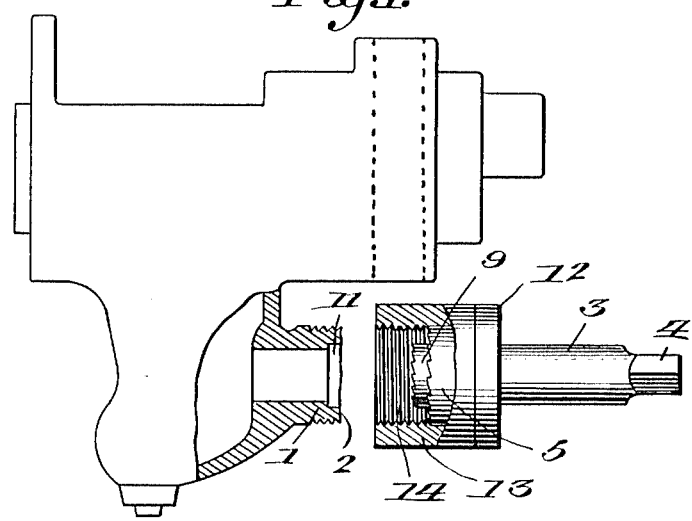
Figure 2:
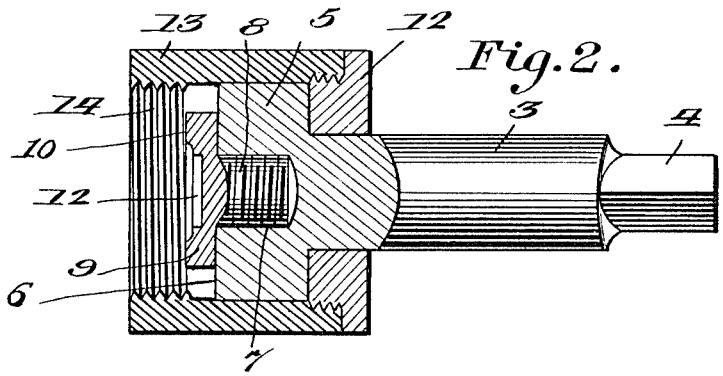
Figure 3:
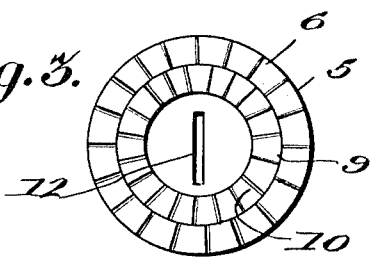
Figure 4:
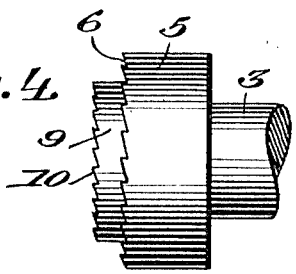

With the foregoing in mind, the special tool will be fully understood from the following description and claims when the same are read in connection with the drawings, accompanying and forming part of this specification, in which:

Figure 1 comprises disconnected views of a triple-valve and my novel tool; a portion of the tool being in section as is also the part of the triple-valve casing to which the tool is applied. Fig. 2 is an enlarged view, partly in section and partly in elevation, of the tool. Fig. 3 is a front elevation of the cutting members of the tool. Fig. 4 is a side elevation showing said members.

Similar numerals of reference designate corresponding parts in all of the views of the drawings.

The threaded portion 1 of the triple-valve casing is broken off at 2, and my novel tool is designed to be turned on the said threaded portion and manipulated to reface and re-counterbore the same.

In the present and best practical embodiment of my invention of which I am cognizant, the tool comprises a shank 3 that is circular in cross-section and is provided with a rear end 4, of angular form in cross-section, for the application of an appropriate device for turning the cutting members of the tool about a common axis. At its forward end the said shank is provided with an integral enlargement 5, of circular form in cross-section, which is provided on its forward side with a circular series of cutting teeth 6 and therefore constitutes one cutting member of the tool. The said teeth 6 are adapted, when the tool is properly applied and manipulated, to reface and render square the end 2 of the valve casing portion 1. A threaded socket 7 is provided in the center of the tool portion 5, and in said socket is disposed the threaded stem 8 of a head 9 which is provided on its forward side with a circular series of teeth 10 and hence constitutes a second cutting member. During the manipulation of the tool the teeth 10 are adapted to deepen the counterbore 11 of the valve casing portion 1. In its face the member 9 is provided with an angular depression 12 to receive a suitable implement employed in connecting the said member 9 to and disconnecting the same from the member 5.

In addition to the elements named my novel tool comprises an interiorly threaded revoluble coupling mounted on the shank 3 back of the enlargement or member 5. The said coupling preferably, though not necessarily, is composed of a collar 12, and a tubular portion 13 mounted on a reduced and threaded portion of the collar and interiorly threaded at 14 to engage the exterior thread of the triple-valve portion 1.

In the practical use of my novel tool, the coupling thereof is turned on the triple-valve portion 1, and then the shank is turned within the coupling whereupon the triple-valve portion 1 will be refaced or rendered square at 2 and its counterbore 11 will be rendered deeper, and this at the same time and with the expenditure of but little effort.

It will be appreciated from the foregoing that incidental to the use of my novel tool, the working portion of the tool is guided and held true to its work at two points— *i. e.*, by the arrangement of the cutting member 5 in the smooth bore of the coupling portion 13, and by the disposition of the shank 3 in the aperture of the coupling portion 12; said shank 3 serving while guiding the cutters to enable the operator to hold the cutting members under pressure to their work, and the inner face of the coupling portion 12 serving as a bearing behind the cutting member 5.

During the use of the tool, the working portion thereof is fed forwardly, as occasion demands, in the smooth bore of the coupling portion 13.

As before stated my novel tool is designed especially to reface and re-counterbore broken check-valve cases, this being materially advantageous since it obviates the necessity of removing and discarding the costly castings of which the said check-valve cases form parts. I desire it understood, however, that my novel tool may be used to advantage in various other connections.

Obviously various changes may be made in the detail construction without involving departure from the scope of my invention as defined in my appended claims.

Having described my invention, what I claim and desire to secure by Letters-Patent, is:

1. A metal-working tool, comprising a shank, of circular form in cross-section, having a rear end of angular form in cross-section; an enlargement of circular form in outline, integral with the shank at the forward end thereof and having a central threaded socket and also having a circular series of cutting teeth on its forward side; a cutting member smaller in diameter than said circular series of cutting teeth, disposed in front of said enlargement and having a threaded stem disposed in the socket of the enlargement, and also having a circular series of cutting teeth on its forward side, and a central angular depression; and a revoluble coupling made up of a collar mounted on the shank back of the integral enlargement and having a reduced and threaded portion, and a tube threaded on said reduced portion and surrounding and extending forward of the cutters and having its forward portion interiorly threaded and also having a circular smooth bore in rear of said threaded portion.

2. A metal working tool, comprising a shank of circular form in cross-section, an enlargement of circular form in outline, fixed with respect to the shank at the forward end thereof and having cutting teeth on its forward side, a smaller cutting member disposed in front of and fixed with respect to said enlargement and having cutting teeth on its forward side, and a revoluble coupling having a collar mounted on the shank behind the said enlargement, and a tube fixed with respect to said collar and surrounding and extending forwardly of the cutting means and having its forward portion interiorly threaded and also having a circular smooth bore in rear of said threaded portion.

3. A metal working tool, comprising a shank of circular form in cross-section, an enlargement of circular form in outline integral with the shank at the forward end thereof and having cutting means on its forward side, and a revoluble coupling made up of a collar mounted on the shank back of the circular enlargement, and a tube fixed with respect to said collar and surrounding and extending forwardly of the circular enlargement and having its forward portion interiorly threaded and also having a circular smooth bore in rear of said threaded portion.

In testimony whereof I have hereunto set my hand in presence of two subscribing witnesses.

ARCHIE N. RUTAN.

Witnesses:
C. W. FOWLER,
T. E. TURPIN.

---

Copies of this patent may be obtained for five cents each, by addressing the "Commissioner of Patents, Washington, D. C."